US009944883B2

(12) United States Patent
Zhang et al.

(10) Patent No.: US 9,944,883 B2
(45) Date of Patent: Apr. 17, 2018

(54) LUBRICANT COMPOSITION, AND PREPARATION METHOD AND USE THEREOF

(71) Applicants: China Petroleum & Chemical Corporation, Beijing (CN); Beijing Research Institute of Chemical Industry, China Petroleum & Chemical Corporation, Beijing (CN)

(72) Inventors: Xiaohong Zhang, Beijing (CN); Chuanlun Cai, Beijing (CN); Jinmei Lai, Beijing (CN); Jinliang Qiao, Beijing (CN); Zhihai Song, Beijing (CN); Guicun Qi, Beijing (CN); Binghai Li, Beijing (CN); Xiang Wang, Beijing (CN); Jianming Gao, Beijing (CN); Hongbin Zhang, Beijing (CN); Haibin Jiang, Beijing (CN); Gu He, Beijing (CN); Yue Ru, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 15/132,636

(22) Filed: Apr. 19, 2016

(65) Prior Publication Data

US 2016/0304803 A1    Oct. 20, 2016

(30) Foreign Application Priority Data

Apr. 20, 2015    (CN) .......................... 2015 1 0189203

(51) Int. Cl.
*C10M 169/04*     (2006.01)
*C10M 119/00*     (2006.01)
(Continued)

(52) U.S. Cl.
CPC ...... *C10M 169/041* (2013.01); *C10M 101/02* (2013.01); *C10M 105/04* (2013.01); *C10M 107/00* (2013.01); *C10M 107/02* (2013.01); *C10M 119/00* (2013.01); *C10M 121/00* (2013.01); *C10M 143/00* (2013.01); *C10M 143/12* (2013.01); *C10M 145/08* (2013.01);
(Continued)

(58) Field of Classification Search
CPC ............ C10M 169/041; C10M 101/02; C10M 105/04; C10M 107/00; C10M 107/02; C10M 119/00; C10M 121/00; C10M 143/00; C10M 143/12; C10M 145/08; C10M 149/08; C10M 169/04; C10M 177/00; C10M 2203/003; C10M 2205/026; C10M 2205/0265; C10M 2205/04; C10M 2205/043; C10M 2205/046; C10M 2205/06; C10M 2205/063; C10M 2205/066; C10M 2205/08; C10M 2205/083; C10M 2205/086; C10M 2205/20; C10M 2205/206; C10M 2209/062; C10M 2209/0625; C10M 2209/084; C10M 2209/0845; C10M 2213/02; C10M 2213/023; C10M 2213/026; C10M 2213/06; C10M 2213/0606; C10M 2217/026; C10M 2217/0265; C10M 2217/045; C10M 2217/0453; C10M 2217/0456; C10M 2221/02; C10M 2221/025; C10M 2229/02; C10M 2229/025; C10M 2205/203; C10N 2220/082; C10N 2230/02; C10N 2230/06; C10N 2230/10; C10N 2250/10; C10N 2250/12; C10N 2260/00; C10N 2270/00
USPC ........................................................ 508/447
See application file for complete search history.

(56) References Cited

U.S. PATENT DOCUMENTS

| | | | | |
|---|---|---|---|---|
| 3,086,942 A | * | 4/1963 | Shewmaker | .......... C08F 291/18 508/456 |
| 4,401,781 A | * | 8/1983 | Yoshifuji | ................ C08L 23/06 524/261 |
| 2010/0294230 A1 | * | 11/2010 | Raj | ...................... C10M 125/26 123/196 AB |

FOREIGN PATENT DOCUMENTS

| CN | 1180079 A | 4/1998 |
|---|---|---|
| CN | 1354056 A | 6/2002 |

(Continued)

OTHER PUBLICATIONS

The Extended European Search Report for European Application No. 16165940.4 dated Oct. 10, 2016.

*Primary Examiner* — James Goloboy
(74) *Attorney, Agent, or Firm* — Duane Morris LLP

(57) ABSTRACT

The present invention relates to the field of lubricant, and specifically provides a lubricant composition and its preparation method and use. The lubricant composition comprises a base oil and rubber particles having radiation crosslinked structure dispersed therein, wherein the base oil is continuous phase and the rubber particles are dispersed phase. The viscosity of the lubricant composition of the present invention can be effectively adjusted as temperature changes. As compared with the lubricant composition comprising chemically crosslinked rubber particles, it has a lower viscosity at low temperatures and a higher viscosity at high temperatures, and has a relatively high viscosity index, which can meet the application requirements at the temperature above 200° C. In addition, the lubricant composition of the present invention also has excellent antiwear and friction-reducing properties.

35 Claims, No Drawings

(51) Int. Cl.
*C10M 121/00* (2006.01)
*C10M 101/02* (2006.01)
*C10M 105/04* (2006.01)
*C10M 149/08* (2006.01)
*C10M 143/12* (2006.01)
*C10M 145/08* (2006.01)
*C10M 143/00* (2006.01)
*C10M 177/00* (2006.01)
*C10M 107/00* (2006.01)
*C10M 107/02* (2006.01)

(52) U.S. Cl.
CPC ........ *C10M 149/08* (2013.01); *C10M 169/04* (2013.01); *C10M 177/00* (2013.01); *C10M 2203/003* (2013.01); *C10M 2205/026* (2013.01); *C10M 2205/0265* (2013.01); *C10M 2205/04* (2013.01); *C10M 2205/043* (2013.01); *C10M 2205/046* (2013.01); *C10M 2205/06* (2013.01); *C10M 2205/063* (2013.01); *C10M 2205/066* (2013.01); *C10M 2205/08* (2013.01); *C10M 2205/083* (2013.01); *C10M 2205/086* (2013.01); *C10M 2205/20* (2013.01); *C10M 2205/203* (2013.01); *C10M 2205/206* (2013.01); *C10M 2209/062* (2013.01); *C10M 2209/0625* (2013.01); *C10M 2209/084* (2013.01); *C10M 2209/0845* (2013.01); *C10M 2213/02* (2013.01); *C10M 2213/023* (2013.01); *C10M 2213/026* (2013.01); *C10M 2213/06* (2013.01); *C10M 2213/0606* (2013.01); *C10M 2213/0613* (2013.01); *C10M 2217/026* (2013.01); *C10M 2217/0265* (2013.01); *C10M 2217/045* (2013.01); *C10M 2217/0453* (2013.01); *C10M 2217/0456* (2013.01); *C10M 2221/02* (2013.01); *C10M 2221/025* (2013.01); *C10M 2229/02* (2013.01); *C10M 2229/025* (2013.01); *C10N 2220/082* (2013.01); *C10N 2230/02* (2013.01); *C10N 2230/06* (2013.01); *C10N 2230/20* (2013.01); *C10N 2250/10* (2013.01); *C10N 2250/12* (2013.01); *C10N 2260/00* (2013.01); *C10N 2270/00* (2013.01)

(56) References Cited

FOREIGN PATENT DOCUMENTS

| | | | |
|---|---|---|---|
| CN | 1402752 | A | 3/2003 |
| CN | 1660981 | A | 8/2005 |
| CN | 1827753 | A | 9/2006 |
| CN | 1840622 | A | 10/2006 |
| CN | 1856527 | A | 11/2006 |
| CN | 1861673 | A | 11/2006 |
| CN | 101058760 | A | 10/2007 |
| CN | 101235337 | A | 8/2008 |
| CN | 101555430 | A | 10/2009 |
| JP | 56129240 | A * | 10/1981 |
| JP | S56129240 | A | 10/1981 |
| JP | 2013227438 | A * | 11/2013 |
| WO | WO01/40356 | | 6/2001 |
| WO | WO01/98395 | | 12/2001 |

* cited by examiner

LUBRICANT COMPOSITION, AND PREPARATION METHOD AND USE THEREOF

CROSS-REFERENCE TO RELATED APPLICATIONS

The present application claims priority to Chinese application No.: 201510189203.4, filed on Apr. 20, 2015, the teaching of which is incorporated herein in its entirety by reference.

TECHNICAL FIELD

The present invention relates to a lubricant composition, preparation method of the lubricant composition, the lubricant composition prepared by the method and use of the lubricant composition as lubricating oil or grease.

BACKGROUND ART

Nanomaterials refer to solid materials consisting of superfine particles having a size of less than 100 nanometers. Because of their size effect, quantum effect, surface effect and interface effect, they have properties that are not possessed by traditional materials. With the rise of nanomaterials and the increasing maturity of their preparation method, it is found that nanomaterials have excellent friction properties. The use of nanoparticles as lubricating oil additives can make lubricating oil have the advantages of both fluid lubrication and solid lubrication, which can not only form an easy-to-shear thin film on the friction surface, but also fill and repair the friction surface to a certain degree, thereby producing a good lubrication effect.

There have been a lot of reports in the prior art about the application of inorganic nanoparticles in the field of lubricants. For example, CN1150958A discloses a polymer composite consisting of high-temperature resistant thermoplastic polymer and nanoparticles, which is filled and reinforced by the high-temperature resistant wear-resistant and self-lubricating low-density nanoparticle, wherein the nanoparticles include nano-siliconnitride, nano-siliconcarbide and nano-silica. The product has excellent self-lubricating properties. CN1301319C discloses a lubricating oil composition comprising silica nanoparticles, which is an extreme-pressure, anti-wear lubricating oil composition having excellent properties. In this invention the blend of base oil and nano-silica are added with the dispersing aid and synergist to achieve the dispersion of silica nanoparticles. CN1180079A and CN1354056A respectively disclose use of fatty acid modified metal oxide or hydroxide nano-fine powder and thiophosphate organic compound modified metal copper nanoparticles in lubricating oil field. CN1827753A discloses a fluorine-containing rare earth lubricating oil nano additive and preparation method thereof, the additive comprising base oil and rare earth fluoride nanoparticles coated with nitrogen-containing organic compound. CN101058760A discloses nano ceramic lubricating oil and preparation method thereof, the lubricating oil comprising conventional lubricating oil ingredients and being added with modified ceramic nanoparticles. It belongs to the field of preparation of lubricating oil medium for machinery operating, and is in particular applicable to lubricating oil and preparation method thereof used in automotive industry. In this invention, a stably dispersed concentrate of ceramic nanoparticles is successfully prepared by pre-dispersion method, and then a nano ceramic engine oil comprising nano ceramic particles in a weight percentage of 0.00001% to 5% is prepared. CN101235337B discloses a lubricant composition applicable to a sliding section or sliding member of an automotive internal combustion engine or power transmission apparatus to significantly lower friction coefficient, which comprises a lubricating base oil, an oxygen-containing organic compound, diamond nanoparticles and a dispersant for the diamond nanoparticles. CN101555430A discloses a lubricating oil composition comprising a base oil stock and carbon nanosphere dispersed therein, wherein the carbon nanosphere is surface grafted with alkyl group and is of hollow structure or filled with metals, metal alloys, metal oxides, metal carbides, metal sulfides, metal nitrides or metal borides.

Furthermore, in addition to inorganic nanoparticles, there are also some reports about the use of organic particulate gel in the field of lubricant. For example, the patents CN1856527A, CN1840622A and CN1861673A, as filed by Rhein Chemie Rheinau Co., Ltd., disclose microgel in non-crosslinkable organic medium and use of crosslinked microgel for improving temperature dependence property of non-crosslinkable organic medium. The dispersed phase of the lubricant composition in these applications is microgels prepared by means of chemical crosslinking with a polyfunctional compound or a peroxide. Although the lubricant composition containing the microgels can reduce the friction coefficient of the organic medium to a certain extent, the viscosity of the lubricant composition has poor viscosity-temperature relationship, as means that the viscosity increases dramatically with descending temperature and reduces rapidly with ascending temperature. The disproportional high viscosity at low temperature or disproportional low viscosity at high temperature may limit the use of the lubricant composition. Therefore, it is urgent to develop a lubricant composition featured with good viscosity-temperature relationship.

SUMMARY OF THE INVENTION

The present invention aims to overcome the defect of the existing lubricant composition having poor viscosity-temperature relationship, and to provide a lubricant composition featured with excellent viscosity-temperature relationship, preparation method of the lubricant composition, the lubricant composition prepared by the method and use of the lubricant composition as lubricating oil or grease.

After a thorough study, the inventors of the present invention have found that in contrast to the dispersed phase in the lubricant composition disclosed in the above-mentioned several patent applications filed by Rhein Chemie Rheinau Co., Ltd., the rubber particles having crosslinked structure as prepared by radiation crosslinking method have a completely different microstructure from the rubber particles having crosslinked structure as prepared by means of chemical crosslinking with a polyfunctional compound or a peroxide. When the dispersed phase in a lubricant composition is the rubber particles having crosslinked structure as prepared by radiation crosslinking method, the lubricant composition has good viscosity-temperature relationship and the viscosity thereof can be adjusted very well as temperature changes, i.e. decreasing the viscosity at the low temperature while increasing the viscosity at the high temperature compared with the prior art. Thereby, it can compensate for the influence on viscosity imposed by the temperature changes to a large extent. In addition, high energy radiation is actually a very clean, safe and efficient energy source, and has been widely used in the fields of health care, food processing, industrial production and the like in many developed countries. On the contrary, there are many non-ignorable problems in connection with the use of chemical crosslinking method (like using peroxide), for example low production efficiency, peroxide residue, possible environmental pollution and the like, all of which may limit the use of the method.

Therefore, in the first aspect, the present invention provides a lubricant composition comprising a base oil and rubber particles having radiation crosslinked structure dispersed therein, wherein the base oil is the continuous phase and the rubber particles are the dispersed phase.

In the second aspect, the present invention provides a method for preparing a lubricant composition, comprising mixing rubber particles having radiation crosslinked structure with the base oil in which the rubber particles is dispersed.

In the third aspect, the present invention provides a lubricant composition prepared by the above method.

In the fourth aspect, the present invention provides use of the lubricant composition as lubricating oil or lubricating grease.

In addition, in the fifth aspect, the present invention provides use of the rubber particles having the radiation crosslinked structure for preparing the lubricant composition.

The lubricant composition of the present invention has viscosity which can be effectively adjusted as temperature changes, and, as compared with the lubricant composition comprising chemically crosslinked rubber particles, it has a lower viscosity at low temperatures while a higher viscosity at high temperatures. Moreover, it has a relatively high viscosity index, which can meet the application requirements at the temperature above 200° C. Thus, the lubricant composition is applicable within a significantly broadened temperature range.

The lubricant composition of the present invention may be used to confect engine oils, gear oils, hydraulic oils and other high-temperature industrial oils. It can be used in various fields including lubricating oils, lubricating grease and the like, especially in the fields such as engine oils which make great demands on the viscosity-temperature relationship. It is suitable for regulating the viscosity-temperature relationship of the lubricant compositions comprising bicyclic aromatic hydrocarbons, polycyclic aromatic hydrocarbons and non-hydrocarbon base oil as the main component which has relatively poor viscosity-temperature relationship. Lubricants having different viscosity-temperature relationships can be easily formulated according to the different working requirements. In addition, the lubricant composition of the present invention also has excellent antiwear and friction-reducing properties. Due to the special structure of the rubber particles resulted from radiation crosslinking, the lubricant composition of the present invention has excellent anti-aging property and color fastness. Thus, the lubricant composition can be used as high performance lubricating oil or grease, especially in the fields which have relatively high requirements on viscosity-temperature relationship, aging properties and friction properties of lubricating oil systems or grease systems.

Other features and advantages of the present invention will be described in detail in the subsequent specific embodiments.

MODE OF CARRYING OUT THE INVENTION

The specific embodiments of the present invention are described in detail below. It should be understood that the specific embodiments described herein are only intended to illustrate and explain the present invention, but not to limit the present invention.

The lubricant composition of the present invention comprises a base oil and rubber particles having radiation crosslinked structure dispersed therein, wherein the base oil is continuous phase, and the rubber particles are dispersed phase. Wherein, the rubber particles are stably dispersed in the base oil.

There are no special limitations as to the amounts of the base oil and the rubber particles in the lubricant composition of the present invention. However, in an advantageous embodiment, in order to make the two components produce a better synergistic effect imparting the obtained lubricant composition with better viscosity-temperature relationship, the amount of the rubber particles is 0.001 to 200 parts by weight, more preferably 0.1 to 100 parts by weight, particularly preferably 0.5 to 50 parts by weight in relation to 100 parts by weight of the base oil.

In the lubricant composition of the present invention, preferably, the rubber particles have an average particle size of 20-2000 nm, more preferably 50-1000 nm, particularly preferably 70-500 nm. When the average particle size of the rubber particles is controlled within the above ranges, it is possible to adjust the viscosity of the lubricant composition more effectively and supply improved low temperature pumping and flow properties, which is conducive to cold start of mechanical equipments and meanwhile to the formation of a relatively thick oil film at high temperatures, thereby reducing the surface friction. That is to say the lubricant composition is applicable in a wider temperature range.

In the lubricant composition of the present invention, preferably, the rubber particles have a gel content of 60 wt % or more, more preferably 75 wt % or more, particularly preferably 80 wt % or more. When the gel content of the rubber particles is controlled within the above ranges, the viscosity of the lubricant composition can be adjusted more effectively as the temperature changes, so that the lubricant composition can be adapted to a wider temperature range. In the present invention, the gel content is a conventional parameter used to characterize the crosslinking degree of rubber in the art, measurable e.g. according to the method disclosed in CN1402752A.

There is no special limitation as to the type of the rubber particles in the present invention. For example, it may be at least one selected from the group consisting of natural rubber, styrene-butadiene rubber, carboxylated styrene-butadiene rubber, nitrile rubber, carboxylated nitrile rubber, polybutadiene rubber, silicone rubber, chloroprene rubber, acrylate rubber, styrene-butadiene pyridine rubber, isoprene rubber, butyl rubber, polysulfide rubber, acrylate-butadiene rubber, polyurethane rubber, fluoro rubber and ethylene-vinyl acetate rubber, and preferably at least one selected from the group consisting of styrene-butadiene rubber, carboxylated styrene-butadiene rubber, nitrile rubber, carboxylated nitrile rubber, acrylate rubber and ethylene-vinyl acetate rubber.

Furthermore, the rubber particles of the present invention are preferably of a homogeneous structure. In the present invention, the term "homogeneous structure" refers to that, as observed by the microscopy, the phenomenon of heterogeneity such as delamination, phase separation and the like is not found within the rubber particles.

Furthermore, the rubber particles suitable for the present invention may also include the products which are modified physically or chemically. The physical modification means the surface modification of the rubber particles via various physical technologies such as flame treatment, corona treatment, plasma treatment, UV treatment, laser treatment, X-ray or gamma-ray treatment, electron beam treatment, ion beam treatment, metallization and coating treatment, absorption treatment and filling treatment etc. The chemical modification means the modification to the surface structure of the rubber particles via chemical reactions, thereby resulting in the rubber particles with improved properties, such as grafting reaction, halogenations reaction, sulfonation reaction, oxidation reaction and functionalization reactions like alkylation or acylation and so on.

In one advantageous embodiment, chemically modified rubber particles are used, preferably the rubber particles modified by grafting reaction in which the grafting agent is at least one selected from the organic compounds containing thiol group, carboxyl (anhydride) group, hydroxyl, peroxy group, epoxy group, halogen, amido and vinyl.

According to the present invention, the rubber particles having radiation crosslinking structure can be prepared by the radiation crosslinking method. for example by radiation crosslinking the rubber latex and thereafter optional spray-drying. The high energy radiation source used for the radiation crosslinking may be at least one selected from the group consisting of cobalt source, ultraviolet ray, high energy electron accelerator. Preferably, the high energy radiation source has a wavelength of less than 0.1 μm, for example, cobalt source. Moreover, in general, the radiation dose should be effective to achieve the gel content of the rubber particles after radiation crosslinking the rubber latex of 60 wt % or more, preferably 75 wt % or more, more preferably 80 wt % or more. Specifically, the irradiation dose may be 0.1-30 Mrad, preferably 0.5-20 Mrad.

There is no special limitation as to the type of the base oil in the present invention. It may be a mineral base oil, a synthetic base oil, or a mixture of both base oils.

As classified according to the base oil classification standard QSHR 001-95 in China, the mineral base oil includes the following five types of base oils: low viscosity index mineral base oil (viscosity index VI≤40), medium viscosity index mineral base oil (40<viscosity index VI≤90), high viscosity index mineral base oil (90<viscosity index VI≤120), very high viscosity index mineral base oil (120<viscosity index VI≤140) and ultrahigh viscosity index mineral base oil (viscosity index VI>140). As defined according to the national standard GB/T1995-1998 "Calculation method of viscosity index for petroleum products", the viscosity index (VI) denotes a conventional quantity value to characterize the oil viscosity change with temperature. For oils having similar kinematic viscosities, a higher viscosity index of an oil denotes a smaller oil viscosity change with temperature. In particular, the mineral base oil mainly includes alkanes, naphthenic hydrocarbons, aromatics, naphthenic aromatic hydrocarbons, and non-hydrocarbon compounds such as oxygen-, nitrogen-, and sulfur-containing organic compounds as well as gum and asphaltenes and the like, wherein olefins are substantially absent. The mineral base oil may be prepared from a mixture of hydrocarbons and non-hydrocarbons having high boiling point and high relative molecular mass in crude oil through atmospheric/vacuum distillation, solvent refining, dewaxing, deasphalting and other procedures. As can be seen from the fractions of the mineral base oil, its hydrocarbons have a carbon number distribution of typically $C_{20}$-$C_{40}$, a boiling range of about 300-550° C., and a relative molecular mass of 250-1000 or more.

The synthetic base oil is usually a lubricating oil having a stable chemical structure and special properties, as prepared using organic synthetic process. The synthetic base oil is at least one selected from the group consisting of synthetic hydrocarbons, alkyl aromatic hydrocarbons, synthetic esters, polyethers, halogenated hydrocarbons, polysiloxanes, and fluorine-containing oils. Each of the above mentioned synthetic base oils may be pure substance or a mixture composed of homologues. Wherein, the synthetic hydrocarbon is at least one selected from the group consisting of ethylene oligomers, propylene oligomers, polybutene, polyisobutylene, poly(α-olefin) (PAO), poly(internal olefin) and halogenated products of the above synthetic hydrocarbons. Wherein, the poly(α-olefin) does not include ethylene oligomers, propylene oligomers and poly(1-butene). The alkyl aromatic hydrocarbon is at least one selected from the group consisting of alkylbenzenes, alkylnaphthalenes and hetero atom (such as oxygen, sulfur, halogen)-containing alkyl aromatic hydrocarbons. The synthetic ester is at least one selected from the group consisting of monoesters, diesters, polyol esters, polymer esters, carbonates, phosphates, citrates, silicates and olefin-acrylate copolymers. The polyether is at least one selected from the group consisting of aliphatic polyethers, polyphenylene oxides, polythioethers and perfluoroalkyl polyethers. The polysiloxane is at least one selected from the group consisting of dimeric siloxanes, trimeric siloxanes, tetrameric siloxanes, octameric siloxanes and cyclic tetrasiloxane.

In addition, the lubricant composition of the present invention may further comprise conventional additives. Examples of the additives include, but are not limited to: anti-aging agents, anti-wear agents, anti-slip agents, antioxidants, anti-foam agents, rust inhibitors, detergents, dispersants, pigments, extreme pressure compositions, friction protective compositions, coupling agents and the like. The amount of the additives can be of a conventional selection for the skilled person in the art.

In one advantageous embodiment, the lubricant composition according to the present invention contains at most 60 parts by weight, preferably at most 50 parts by weight, such as at most 30 parts by weight or 15 parts by weight or 5 parts by weight of rubber particles having chemically crosslinked structure, in relation to 100 parts of weight of the base oil. In particular, in case that the inventive lubricant composition is a lubricating oil, it contains at most 15 parts by weight, preferably at most 10 parts by weight, more preferably at most 5 parts by weight and most preferably at most 3 parts by weight of rubber particles having chemically crosslinked structure; while in case that the inventive lubricant composition is a lubricating grease, it contains at most 60 parts by weight, preferably at most 50 parts by weight or 40 parts by weight, such as 30-10 parts by weight of rubber particles having chemically crosslinked structure. More preferably, the lubricant composition according to the present invention contains no rubber particles having chemically crosslinked structure. Said rubber particles having chemically crosslinked structure refer to microgels prepared by means of chemical crosslinking with a polyfunctional compound or a peroxide, such as those disclosed in CN1856527A, CN1840622A and CN1861673A.

The method for preparing a lubricant composition according to the present invention comprises mixing rubber particles having radiation crosslinked structure with the base oil in which the rubber particles is dispersed.

There are no special limitations as to the amounts of the base oil and the rubber particles to be dispersed. However, in order to make the two components produce a better synergistic effect imparting the obtained lubricant composition with better viscosity-temperature relationship, the amount of the rubber particles to be dispersed is preferably 0.001 to 200 parts by weight, more preferably 0.1 to 100 parts by weight, particularly preferably 0.5 to 50 parts by weight in relation to 100 parts by weight of the base oil.

According to the method for preparing the lubricant composition of the present invention, preferably, the rubber particles to be dispersed are rubber particle clusters formed by agglomeration of rubber particles having an average particle size of 20-2000 nm, more preferably 50-1000 nm, particularly preferably 70-500 nm. After dispersing the rubber particles to be dispersed in the base oil, the agglomerated rubber particles can be well dispersed, thereby distributing in the base oil in an average particle size of 20-2000 nm, more preferably 50-1000 nm, particularly preferably 70-500 nm.

In the method for preparing the lubricant composition of the present invention, the gel content and preferable amount of the rubber particles to be dispersed are as discussed above.

The rubber particles to be dispersed are preferably of a homogeneous structure.

The rubber particles to be dispersed may be commercially available or prepared according to various methods as well known in the art or as discussed above. For example, the rubber particles to be dispersed may be a fully vulcanized powder rubber that is prepared according to the International Patent Application WO01/40356 (priority date: Dec. 3, 1999) as filed by the applicant of the present invention on Sep. 18, 2000 and the International Patent Application WO01/98395 (priority date: Jun. 15, 2000) as filed by the applicant of the present invention on Jun. 15, 2001. Furthermore, examples of the fully vulcanized powdery rubber include, but are not limited to: fully vulcanized powdery natural rubber, fully vulcanized powdery styrene-butadiene rubber, fully vulcanized powdery carboxylated styrene-butadiene rubber, fully vulcanized powdery nitrile rubber, fully vulcanized powdery carboxylated nitrile rubber, fully vulcanized powdery polybutadiene rubber, fully vulcanized powdery silicone rubber, fully vulcanized powdery chloroprene rubber, fully vulcanized powdery acrylate rubber, fully vulcanized powdery styrene-butadiene pyridine rubber, fully vulcanized powdery isoprene rubber, fully vulcanized powdery butyl rubber, fully vulcanized powdery polysulfide rubber, fully vulcanized powdery acrylate-butadiene rubber, fully vulcanized powdery polyurethane rubber, fully vulcanized powdery fluoro rubber and fully vulcanized powdery ethylene-vinyl acetate rubber, and preferably at least one selected from the group consisting of fully vulcanized powdery styrene-butadiene rubber, fully vulcanized powdery carboxylated styrene-butadiene rubber, fully vulcanized powdery nitrile rubber, fully vulcanized powdery carboxylated nitrile rubber, fully vulcanized powdery acrylate rubber and fully vulcanized powdery ethylene-vinyl acetate rubber. The fully vulcanized powdery rubber has a gel content of preferably 60 wt % or more, more preferably 75 wt % or more, particularly preferably 80 wt % or more. The fully vulcanized powdery rubber has an average particle size of preferably 20-2000 nm, more preferably 50-1000 nm, particularly preferably 70-500 nm.

In addition, each particle in the fully vulcanized powdery rubber is homogeneous, i.e., no heterogeneous phenomenon such as delamination or phase separation etc. found within the particle under the microscopy techniques known in the art.

In addition, during the preparation of the rubber particles to be dispersed by radiation crosslinking, a crosslinking agent may be optionally used. The crosslinking agent may be any one selected from the group consisting of monofunctional crosslinking agents, bifunctional crosslinking agents, trifunctional crosslinking agents, tetrafunctional crosslinking agents and crosslinking agents having five or more functional groups. Examples of the monofunctional crosslinking agents include, but are not limited to: octyl (meth)acrylate, isooctyl (meth)acrylate, glycidyl (meth)acrylate. Examples of the bifunctional crosslinking agents include, but are not limited to: 1,4-butanediol di(meth)acrylate, 1,6-hexanediol di(meth)acrylate, diethylene glycol di(meth)acrylate, triethylene glycol di(meth)acrylate, neopentyl glycol di(meth)acrylate, divinyl benzene. Examples of the trifunctional crosslinking agents include, but are not limited to: trimethylolpropane tri(meth)acrylate and/or pentaerythritol tri(meth)acrylate. Examples of the tetrafunctional crosslinking agents include, but are not limited to: pentaerythritol tetra(meth)acrylate and/or ethoxylated pentaerythritol tetra(meth)acrylate. Examples of the crosslinking agents having five or more functional groups include, but are not limited to: dipentaerythritol penta(meth)acrylate. In the context, the term "(meth)acrylate" refers to acrylate or methacrylate. These crosslinking agents may be used in combination in any manner, as long as they facilitate the crosslinking under radiation. Furthermore, the crosslinking agent is generally added in an amount of 0.1 to 10% by weight, preferably 0.5-9% by weight, more preferably 0.7-7% by weight relative to the weight of dry rubber in the latex.

In addition, the method for preparing the lubricant composition of the present invention may also comprise mixing and dispersing the additives together with the base oil and the rubber particles to be dispersed. The types of the base oil and the additives have been described above.

There is no special limitation as to the manner of mixing and dispersing, as long as that it can render the rubber particles effectively dispersed in the base oil, thereby obtaining a lubricant composition comprising the base oil as continuous phase and the rubber particles as dispersed phase.

Advantageously, however, the method for preparing the lubricant composition according to the present invention further comprises at least one, preferably at least two redispersion steps.

In one preferred embodiment of the present invention, the method for preparing the lubricant composition comprises:
(1) adding the rubber particles to be dispersed into the base oil and mixing by mechanical stirring, so that the rubber particles are dispersed or suspended in the base oil to obtain a preliminarily dispersed composition;
(2) Redispersing the preliminarily dispersed composition until the dispersed rubber particles have an average particle size of 20-2000 nm, preferably 50-1000 nm, more preferably 70-500 nm.

By using this preferred manner, the rubber particles can be dispersed in the base oil with the initial particle size, thereby obtaining a lubricant composition having better viscosity-temperature relationship.

According to another preferred embodiment of the present invention, the method for preparing the lubricant composition further comprises step (3), a second redispersion of the composition, wherein the composition obtained in step (2) is subjected to the secondary redispersion after placing at a temperature not lower than 80° C., preferably not lower than 100° C. for at least 1 hour, preferably at least 2 hours, more preferably at least 4 hours, most preferably 4 to 10 hours, so that the crosslinked rubber particles are fully infiltrated and swollen with the base oil and they are dispersed in the base oil in a smaller particle size, thereby obtaining a lubricant composition having much better viscosity-temperature relationship. In addition, in step (3), when placing the composition obtained in step (2) at a temperature not lower than 80° C. for at least 1 hour, it is possible to simultaneously conduct the continuous or intermittent stirring so as to make the material heated more evenly.

The mixing by mechanical stirring in step (1) can be performed in the existing various mechanical mixing devices, for example, a high speed mixer, a kneader and other mechanical mixing devices. There are no special limitations as to the mixing conditions by mechanical stirring, as long as they can make the rubber particles to be dispersed having radiation crosslinked structure dispersed or suspended in the base oil without causing any changes with respect to the properties of the rubber particles to be dispersed having radiation crosslinked structure and the base oil.

In the method for preparing the lubricant composition of the present invention, the redispersing in step (2) and the secondary redispersing in step (3) can be performed, independently of each other, in at least one mixing device selected from a homogenizer, a glass bead mill, a three-roll mill, a single-screw extruder, a multi-screw extruder, a kneader, a dissolver, and an ultrasonic disperser; preferably in a homogenizer, a three-roll mill and an ultrasonic disperser. The latter three preferred mixing devices have the advantages of high processing output, good mixing effect, relatively simple subsequent cleaning operation. Most preferably, the redispersing in step (2) and the secondary redispersing in step (3) are performed in a homogenizer. In the course of the dispersion, pursuant to different requirements on dispersion quality, the product is subjected to cooling and then multiple dispersing through the mixing device until the rubber particles dispersed in the base oil arrive at an average particle size of 20-2000 nm, preferably 50-1000 nm, more preferably 70-500 nm. There are no special limitations as to the conditions of the redispersing and the multiple redispersing (e.g. secondary redispersing) in the present invention, as long as they do not impair the properties of the base oil and the rubber particles during the dispersion process and achieve the average rubber particle size of 20-2000 nm, preferably 50-1000 nm, more preferably 70-500 nm, as is well known to the skilled person in the art.

In addition, said placing operation in step (3) is preferably performed in the existing various sealed heating devices, for example, a high temperature oven, a vacuum high temperature oven, a heating kettle or similar sealed heating vessels, as may improve the heat treatment efficiency, spare energy and simultaneously reduce contact of the base oil and the rubber particles with air (oxygen) to inhibit the thermal oxidation and keep the stable product properties.

In the third aspect, the present invention further provides a lubricant composition prepared by the above method.

In addition, the present invention further provides use of the lubricant composition as lubricating oil or lubricant grease. In general, the lubricating oil refers to the lubricant composition containing rubber particles in an amount of less than 10% by weight, and the grease refers to the lubricant composition containing rubber particles in an amount of 10% by weight or more.

EXAMPLES

The present invention is described in detail by the following examples.

(I) Raw materials used in examples and comparative examples are given as follows:

Mineral base oil: manufactured by SINOPEC, trademark Ib150, viscosity at 40° C. being 32.6 mm$^2$/s, viscosity index 90.

Synthetic base oil: manufactured by SINOPEC, trademark PAO40, poly($\alpha$-olefin), viscosity at 40° C. being 40.0 mm$^2$/s, viscosity index 110.

Styrene-butadiene rubber particles to be dispersed: manufactured by SINOPEC, trademark VP101, average particle size 100 nm, gel content 90% by weight; as observed under microscope, no phenomenon of delamination or phase separation found within the styrene-butadiene rubber particles which are prepared by radiation crosslinking a styrene-butadiene rubber latex with a cobalt source and then spray drying.

Peroxide crosslinked styrene-butadiene rubber particles: prepared according to the method disclosed in the patent CN1840622A and then dried by spray drying method; the rubber latex being styrene-butadiene rubber latex (having the same composition as the rubber latex for preparing the styrene-butadiene rubber particles VP101); the crosslinking agent used being dicumyl peroxide (DCP), and the finally obtained peroxide crosslinked styrene-butadiene rubber particles having an average particle size of 100 nm with a gel content of 90% by weight.

Acrylate rubber particles to be dispersed: manufactured by SINOPEC, trademark VP301, average particle size 100 nm, gel content 90% by weight; as observed under microscope, no phenomenon of delamination or phase separation found within the acrylate rubber particles which are prepared by radiation crosslinking an acrylate rubber latex with a cobalt source and then spray drying.

Peroxide crosslinked acrylate rubber particles: prepared according to the method disclosed in the patent CN1840622A and then dried by spray drying method; the rubber latex being acrylate rubber latex (having the same composition as the rubber latex for preparing the acrylate rubber particles VP301); the crosslinking agent used being dicumyl peroxide (DCP) and the finally obtained peroxide crosslinked acrylate rubber particles having an average particle size of 100 nm with a gel content of 90% by weight.

Nitrile rubber particles to be dispersed: manufactured by SINOPEC, trademark VP401, average particle size 100 nm, gel content 90% by weight; as observed under microscope, no phenomenon of delamination or phase separation found within the nitrile rubber particles which are prepared by radiation crosslinking a nitrile rubber latex with a cobalt source and then spray drying.

Peroxide crosslinked nitrile rubber particles: prepared according to the method disclosed in the patent CN1840622A and then dried by spray drying method; the rubber latex being nitrile rubber latex (having the same composition as the rubber latex for preparing the nitrile rubber particles VP401), the crosslinking agent used being dicumyl peroxide (DCP), and the finally obtained peroxide crosslinked nitrile rubber particles having an average particle size of 100 nm with a gel content of 90% by weight.

Ethylene-vinyl acetate rubber particles to be dispersed: manufactured by SINOPEC, trademark VP801, obtained by agglomeration of ethylene-vinyl acetate rubber particles having an average particle size of 500 nm, gel content 90% by weight; as observed under microscope, no phenomenon of delamination or phase separation found within the ethylene-vinyl acetate rubber particles which are prepared by radiation crosslinking an ethylene-vinyl acetate rubber latex with a cobalt source and then spray drying.

Peroxide crosslinked ethylene-vinyl acetate rubber particles: prepared according to the method disclosed in the patent CN1840622A and then dried by spray drying method; the rubber latex being ethylene-vinyl acetate rubber latex (having the same composition as the rubber latex for preparing the ethylene-vinyl acetate rubber particles VP801), the crosslinking agent used being dicumyl peroxide (DCP) and the finally obtained peroxide crosslinked ethylene-vinyl acetate rubber particles having an average particle size of 500 nm with a gel content of 90% by weight.

(II) Experimental data in examples and comparative examples are measured using the following instruments and methods:

(1) Kinematic viscosity: kinematic viscosities at 40° C. and 100° C. are respectively measured according to the standard GB/T265-1998 "Measurement method of kinematic viscosity and calculation method of dynamic viscosity for petroleum products", using standard glass capillary method;

(2) Viscosity index (VI): it is measured according to the standard GB/T1995-1998 "Calculation method of viscosity index for petroleum products", including Method A, Method B, in which when VI<100 the viscosity index is calculated according to Method A using the following equation:

$$VI=[(L-H)]/[(L-U)]\times 100$$

wherein, L is kinematic viscosity at 40° C. (mm$^2$/s) of an oil product which has the same kinematic viscosity at 100° C. as that of the sample and has a viscosity index of 0, H is kinematic viscosity at 40° C. (mm$^2$/s) of an oil product which has the same kinematic viscosity at 100° C. as that of the sample and has a viscosity index of 100, and U is kinematic viscosity at 40° C., mm$^2$/s, of the sample; and when VI≥100, the viscosity index is calculated according to Method B using the following equation:

$$VI=\{[(\text{anti log } N-1)/0.00715]\}+100$$

wherein, N=(log H−log U)/log Y, U is kinematic viscosity at 40° C. (mm$^2$/s) of the sample, Y is kinematic viscosity at 100° C. (mm$^2$/s) of the sample, H is kinematic viscosity at 40° C. (mm$^2$/s) of an oil product which has the same kinematic viscosity at 100° C. as that of the sample and has a viscosity index of 100, and anti log N is an inverse function of log N.

(3) Discoloration index (IC): yellow index (YI) of the lubricant composition is calculated according to the following formula based on the results of measurement conducted according to the standard HG/T3862-2006 "Test method of yellow index for plastics" using a TCP2 series automatic color difference meter:

YI=100(1.28X−1.06Z)/Y, where X, Y, Z are respectively tristimulus values measured under a standard C light source. The discoloration index (IC) of the lubricant composition is defined as follows:

$$IC=YI_{150}/YI_{25}$$

wherein $YI_{150}$ is yellow index of lubricant after high temperature test (keeping at 150° C. for 4 hours), $YI_{25}$ is yellow index of lubricant at room temperature (25° C.), IC can intuitively reflect the high temperature resistance and aging resistance of the lubricant composition.

(4) Dynamic viscosity: dynamic viscosities at 40° C. and 100° C. of the lubricant composition are respectively measured using a NDJ-5S type digital rotary viscometer, with oil-bath heating.

(5) Oil separation: it is measured according to the standard SH/T 0324-92 "Measurement method (static method) of oil separation from grease on steel screen", wherein the sample is placed on a 100 mesh steel screen, kept in a 100° C. oven for 24 hours and then taken out for the measurement of oil separation.

(6) Friction coefficient: interfacial friction property of the lubricant composition is measured using an electronic tensile tester at a load of 0.2 kg. The static friction coefficients μs and dynamic friction coefficients μk of aluminum-steel (no lubrication) and aluminum-steel (lubrication) are compared, wherein "no lubrication" indicates that the surface of aluminum-steel is not coated with any lubricant composition, and "lubrication" indicates that the surface of aluminum-steel has been coated with the corresponding lubricant composition.

Example 1

This example was carried out to illustrate the inventive lubricant composition and the preparation method thereof.

100 parts by weight of mineral base oil Ib150 and 0.5 parts by weight of styrene-butadiene rubber particles VP101 to be dispersed were mixed with mechanical stirring till uniform, and then homogenized in a high pressure homogenizer for four cycles at a pressure of 100 MPa to produce the blended material, wherein the temperature of the material after each cycle was controlled not to exceed 70° C. through a water bath. Kinematic viscosity and viscosity index of the blended material were shown in Table 1.

The obtained blended material was kept in a high temperature oven at 150° C. for at least 4 hours, and then homogenized for a second time in a high pressure homogenizer for four cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Comparative Example 1

This comparative example was carried out to illustrate the reference lubricant composition and the preparation method thereof.

A blended material and a lubricant composition was prepared according to Example 1, except that the styrene-butadiene rubber particles VP101 to be dispersed were replaced with the same parts by weight of peroxide crosslinked styrene-butadiene rubber particles, thereby producing the reference blended material and the reference lubricant composition. The kinematic viscosity and viscosity index of the reference blended material were shown in Table 1. The kinematic viscosity and viscosity index as well as color change before and after high temperature test of the reference lubricant composition were respectively shown in Table 1 and Table 2.

Example 2

This example was carried out to illustrate the inventive lubricant composition and the preparation method thereof.

100 parts by weight of mineral base oil Ib150 and 1 parts by weight of styrene-butadiene rubber particles VP101 to be dispersed were mixed with mechanical stirring till uniform, and then homogenized in a high pressure homogenizer for six cycles at a pressure of 100 MPa to produce the blended material, wherein the temperature of the material after each cycle was controlled not to exceed 70° C. through a water bath. Kinematic viscosity and viscosity index of the blended material were shown in Table 1.

The obtained blended material was kept in a high temperature oven at 150° C. for at least 4 hours, and then homogenized for a second time in a high pressure homogenizer for six cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Comparative Example 2

This comparative example was carried out to illustrate the reference lubricant composition and the preparation method thereof.

A blended material and a lubricant composition was prepared according to Example 2, except that the styrene-butadiene rubber particles VP101 to be dispersed were replaced with the same parts by weight of peroxide crosslinked styrene-butadiene rubber particles, thereby producing the reference blended material and the reference lubricant composition. The kinematic viscosity and viscosity index of the reference blended material were shown in Table 1. The kinematic viscosity and viscosity index as well as color change before and after high temperature test of the reference lubricant composition were respectively shown in Table 1 and Table 2.

Example 3

This example was carried out to illustrate the inventive lubricant composition and the preparation method thereof.

100 parts by weight of mineral base oil Ib150 and 3 parts by weight of styrene-butadiene rubber particles VP101 to be dispersed were mixed with mechanical stirring till uniform, and then homogenized according to the method of Example 2 to produce a blended material. Kinematic viscosity and viscosity index of the blended material were shown in Table 1.

The obtained blended material was kept in a high temperature oven at 150° C. for at least 4 hours, and then homogenized for a second time in a high pressure homogenizer for six cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Comparative Example 3

This comparative example was carried out to illustrate the reference lubricant composition and the preparation method thereof.

A blended material and a lubricant composition was prepared according to Example 3, except that the styrene-butadiene rubber particles VP101 to be dispersed were replaced with the same parts by weight of peroxide crosslinked styrene-butadiene rubber particles, thereby producing the reference blended material and the reference lubricant composition. The kinematic viscosity and viscosity index of the reference blended material were shown in Table 1. The kinematic viscosity and viscosity index as well as color change before and after high temperature test of the reference lubricant composition were respectively shown in Table 1 and Table 2.

Example 4

This example was carried out to illustrate the inventive lubricant composition and the preparation method thereof.

100 parts by weight of mineral base oil Ib150 and 5 parts by weight of styrene-butadiene rubber particles VP101 to be dispersed were mixed with mechanical stirring till uniform, and then homogenized in a high pressure homogenizer for ten cycles at a pressure of 100 MPa to produce the blended material, wherein the temperature of the material after each cycle was controlled not to exceed 70° C. through a water bath. Kinematic viscosity and viscosity index of the blended material were shown in Table 1.

The obtained blended material was kept in a high temperature oven at 150° C. for at least 4 hours, and then homogenized for a second time in a high pressure homogenizer for ten cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Example 5

This example was carried out to illustrate the inventive lubricant composition and the preparation method thereof.

100 parts by weight of mineral base oil Ib150 and 0.5 parts by weight of acrylate rubber particles VP301 to be dispersed were mixed with mechanical stirring till uniform, and then homogenized in a high pressure homogenizer for four cycles at a pressure of 100 MPa to produce the blended material, wherein the temperature of the material after each cycle was controlled not to exceed 70° C. through a water bath. Kinematic viscosity and viscosity index of the blended material were shown in Table 1.

The above blended material was kept in a high temperature oven at 150° C. for at least 4 hours, and then homogenized for a second time in a high pressure homogenizer for four cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Comparative Example 4

This comparative example was carried out to illustrate the reference lubricant composition and the preparation method thereof.

A blended material and a lubricant composition was prepared according to Example 5, except that the acrylate rubber particles VP301 to be dispersed were replaced with the same parts by weight of peroxide crosslinked acrylate rubber particles, thereby producing the reference blended material and the reference lubricant composition. The kinematic viscosity and viscosity index of the reference blended material were shown in Table 1. The kinematic viscosity and viscosity index as well as color change before and after high temperature test of the reference lubricant composition were respectively shown in Table 1 and Table 2.

Example 6

This example was carried out to illustrate the inventive lubricant composition and the preparation method thereof.

100 parts by weight of mineral base oil Ib150 and 0.5 parts by weight of nitrile rubber particles VP401 to be dispersed were mixed with mechanical stirring till uniform, and then homogenized in a high pressure homogenizer for four cycles at a pressure of 100 MPa to produce the blended material, wherein the temperature of the material after each cycle was controlled not to exceed 70° C. through a water bath. Kinematic viscosity and viscosity index of the blended material were shown in Table 1.

The obtained blended material was kept in a high temperature oven at 150° C. for at least 4 hours, and then homogenized for a second time in a high pressure homogenizer for four cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Comparative Example 5

This comparative example was carried out to illustrate the reference lubricant composition and the preparation method thereof.

A blended material and a lubricant composition was prepared according to Example 6, except that the nitrile rubber particles VP401 to be dispersed were replaced with the same parts by weight of peroxide crosslinked nitrile rubber particles, thereby producing the reference blended material and the reference lubricant composition. The kinematic viscosity and viscosity index of the reference blended material were shown in Table 1. The kinematic viscosity and viscosity index as well as color change before and after high temperature test of the reference lubricant composition were respectively shown in Table 1 and Table 2.

Example 7

This example was carried out to illustrate the inventive lubricant composition and the preparation method thereof.

100 parts by weight of mineral base oil Ib150 and 0.5 parts by weight of ethylene-vinyl acetate rubber particles VP801 to be dispersed were mixed with mechanical stirring till uniform, and then homogenized in a high pressure homogenizer for four cycles at a pressure of 100 MPa to produce the blended material, wherein the temperature of the material after each cycle was controlled not to exceed 70° C. through a water bath. Kinematic viscosity and viscosity index of the blended material were shown in Table 1.

The obtained blended material was kept in a high temperature oven at 150° C. for at least 4 hours, and then homogenized for a second time in a high pressure homogenizer for four cycles at a pressure of 100 MPa (i.e. the secondary redispersing) to produce the lubricant composition. Kinematic viscosity and viscosity index as well as color change before and after high temperature test of the lubricant composition were respectively shown in Table 1 and Table 2.

Comparative Example 6

This comparative example was carried out to illustrate the reference lubricant composition and the preparation method thereof.

A blended material and a lubricant composition was prepared according to Example 7, except that the ethylene-vinyl acetate rubber particles VP801 to be dispersed were replaced with the same parts by weight of peroxide crosslinked ethylene-vinyl acetate rubber particles, thereby producing the reference blended material and the reference lubricant composition. The kinematic viscosity and viscosity index of the reference blended material were shown in Table 1. The kinematic viscosity and viscosity index as well as color change before and after high temperature test of the reference lubricant composition were respectively shown in Table 1 and Table 2.

TABLE 1

Kinematic viscosity and viscosity index of the lubricant composition

| Examples | Kinematic viscosity at 40° C., mm$^2$/s | | Kinematic viscosity at 100° C., mm$^2$/s | | Viscosity index | |
|---|---|---|---|---|---|---|
| | Before 2$^{nd}$ redispersing | After 2$^{nd}$ redispersing | Before 2$^{nd}$ redispersing | After 2$^{nd}$ redispersing | Before 2$^{nd}$ redispersing | After 2$^{nd}$ redispersing |
| Example 1 | 33.90 | 34.10 | 5.76 | 5.88 | 111 | 116 |
| Comparative Example 1 | 35.32 | 35.35 | 5.51 | 5.55 | 88 | 91 |
| Example 2 | 35.30 | 37.40 | 6.61 | 6.95 | 145 | 148 |
| Comparative Example 2 | 40.47 | 41.57 | 6.36 | 6.54 | 106 | 109 |
| Example 3 | 50.44 | 51.66 | 10.58 | 11.48 | 206 | 224 |
| Comparative Example 3 | 72.18 | 75.58 | 9.78 | 10.05 | 116 | 121 |
| Example 4 | 72.00 | 77.95 | 15.59 | 16.66 | 231 | 231 |
| Example 5 | 33.92 | 34.08 | 5.81 | 5.86 | 113 | 115 |
| Comparative Example 4 | 35.52 | 35.60 | 5.58 | 5.62 | 92 | 94 |
| Example 6 | 32.90 | 33.12 | 5.58 | 5.74 | 107 | 114 |
| Comparative Example 5 | 34.85 | 35.10 | 5.42 | 5.50 | 85 | 89 |
| Example 7 | 34.94 | 34.86 | 5.75 | 5.74 | 104 | 104 |
| Comparative Example 6 | 36.36 | 36.67 | 5.53 | 5.63 | 83 | 90 |

TABLE 2

Appearance changes of the lubricant composition before and after high temperature treatment

| Examples | Room temperature yellow index $YI_{25}$ | High temperature yellow index $YI_{150}$ | Discoloration index IC |
|---|---|---|---|
| Example 1 | 5.1 | 37.2 | 7.3 |
| Comparative Example 1 | 5.0 | 44.0 | 8.8 |
| Example 2 | 7.0 | 50.5 | 7.2 |
| Comparative Example 2 | 7.2 | 68.6 | 9.5 |
| Example 3 | 7.4 | 44.7 | 6.0 |
| Comparative Example 3 | 7.5 | 66.4 | 8.8 |
| Example 4 | 7.2 | 46.9 | 6.5 |
| Example 5 | 5.0 | 37.2 | 7.4 |
| Comparative Example 4 | 5.5 | 46.9 | 8.5 |
| Example 6 | 6.2 | 45.0 | 7.3 |
| Comparative Example 5 | 7.0 | 66.9 | 9.6 |
| Example 7 | 5.0 | 35.2 | 7.0 |
| Comparative Example 6 | 5.1 | 40.0 | 7.8 |

As could be seen from the results in Table 1, as compared with the lubricant composition comprising the rubber particles obtained by peroxide crosslinking, the lubricant composition comprising the rubber particles having radiation crosslinked structure obtained by radiation crosslinking method had a lower viscosity at low temperature (40° C.) and a higher viscosity at high temperature (100° C.), and had a higher viscosity index. Thus, the lubricant composition of the present invention had a better viscosity-temperature relationship, and had better low temperature pumping and flow properties, which is conducive to cold start of mechanical equipment and the formation of a relatively thick oil film at high temperatures, thereby reducing surface friction and improving the lubricating effect. Therefore, the lubricant composition of the present invention can be adapted to a wider temperature range, reduce the friction and thus provide the better energy-saving effect.

In addition, as could be seen from the results in Table 2, the lubricant composition of the present invention had excellent aging resistance and color fastness.

Example 8

This example was carried out to illustrate the inventive lubricant composition and the preparation method thereof.

100 parts by weight of mineral base oil Ib150 and 10 parts by weight of styrene-butadiene rubber particles VP101 to be dispersed were mixed with mechanical stirring till uniform, and then homogenized in a three-roll mill for five cycles at a rotation rate of 280 rpm to produce a lubricant composition. Dynamic viscosity, oil separation and lubricating property of the lubricant composition were shown in Table 3 and Table 4.

Example 9

This example was carried out to illustrate the inventive lubricant composition and the preparation method thereof.

100 parts by weight of mineral base oil Ib150 and 30 parts by weight of styrene-butadiene rubber particles VP101 to be dispersed were mixed with mechanical stirring till uniform, and then homogenized in a three-roll mill for five cycles at a rotation rate of 200 rpm to produce a lubricant composition. Dynamic viscosity, oil separation and lubricating property of the lubricant composition were shown in Table 3 and Table 4.

Example 10

This example was carried out to illustrate the inventive lubricant composition and the preparation method thereof.

100 parts by weight of mineral base oil Ib150 and 50 parts by weight of styrene-butadiene rubber particles VP101 to be dispersed were mixed with mechanical stirring till uniform, and then homogenized in a three-roll mill for five cycles at a rotation rate of 200 rpm to produce a lubricant composition. Dynamic viscosity, oil separation and lubricating property of the lubricant composition were shown in Table 3 and Table 4.

Example 11

This example was carried out to illustrate the inventive lubricant composition and the preparation method thereof.

100 parts by weight of mineral base oil Ib150 and 100 parts by weight of styrene-butadiene rubber particles VP101 to be dispersed were mixed with mechanical stirring till uniform, and then homogenized in a high pressure homogenizer for five cycles at a rotation rate of 100 rpm to produce a lubricant composition. Dynamic viscosity, oil separation and lubricating property of the lubricant composition were shown in Table 3 and Table 4.

Example 12

This example was carried out to illustrate the inventive lubricant composition and the preparation method thereof.

100 parts by weight of synthetic base oil PAO40 and 10 parts by weight of styrene-butadiene rubber particles VP101 to be dispersed were mixed with mechanical stirring till uniform, and then homogenized in a high pressure homogenizer for five cycles at a rotation rate of 200 rpm to produce a lubricant composition. Dynamic viscosity, oil separation and lubricating property of the lubricant composition were shown in Table 3 and Table 4.

Example 13

This example was carried out to illustrate the inventive lubricant composition and the preparation method thereof.

100 parts by weight of synthetic base oil PAO40 and 50 parts by weight of styrene-butadiene rubber particles VP101 to be dispersed were mixed with mechanical stirring till uniform, and then homogenized in a high pressure homogenizer for five cycles at a rotation rate of 100 rpm to produce a lubricant composition. Dynamic viscosity, oil separation and lubricating property of the lubricant composition were shown in Table 3 and Table 4.

Example 14

This example was carried out to illustrate the inventive lubricant composition and the preparation method thereof.

100 parts by weight of synthetic base oil PAO40 and 100 parts by weight of styrene-butadiene rubber particles VP101 to be dispersed were mixed with mechanical stirring till uniform, and then homogenized in a high pressure homogenizer for five cycles at a rotation rate of 100 rpm to produce a lubricant composition. Dynamic viscosity, oil separation and lubricating property of the lubricant composition were shown in Table 3 and Table 4.

TABLE 3

Dynamic viscosity and oil separation of the lubricant composition

| Examples | Dynamic viscosity (40° C.), mPa · s | Dynamic viscosity (100° C.), mPa · s | Oil separation, % |
|---|---|---|---|
| Example 8 | 345 | 880 | >20 |
| Example 9 | 1480 | 13340 | 5.0 |
| Example 10 | 5920 | 80200 | 4.8 |
| Example 11 | 25500 | — | 0 |
| Example 12 | 860 | 2800 | >10 |
| Example 13 | 6950 | 95600 | 5.2 |
| Example 14 | 35600 | — | 0.5 |

In Table 3, "—" denotes beyond the test range ($10^5$ mPa · s).

TABLE 4

Lubricating property of the lubricant composition

| | Static friction coefficient, $\mu_s$ | | Dynamic friction coefficient, $\mu_k$ | |
|---|---|---|---|---|
| Examples | No lubrication | Lubrication | No lubrication | Lubrication |
| Example 8 | 0.179 | 0.114 | 0.158 | 0.098 |
| Example 9 | 0.179 | 0.115 | 0.158 | 0.099 |
| Example 10 | 0.179 | 0.102 | 0.158 | 0.097 |
| Example 11 | 0.179 | 0.101 | 0.158 | 0.077 |
| Example 12 | 0.179 | 0.144 | 0.158 | 0.135 |
| Example 13 | 0.179 | 0.136 | 0.158 | 0.107 |
| Example 14 | 0.179 | 0.126 | 0.158 | 0.098 |

As could be seen from the results in Table 3, the lubricant composition comprising the rubber particles having radiation crosslinked structure obtained by radiation crosslinking method had a lower viscosity at low temperature (40° C.) and a higher viscosity at high temperature (100° C.). Thus, the lubricant composition of the present invention had better viscosity-temperature relationship and could be adapted to a wider temperature range.

In addition, as could be seen from the results in Table 4, the lubricant composition of the present invention had very excellent antiwear and friction-reducing properties.

The preferred embodiments of the present invention have been described in detail above. However, the present invention is not limited to the specific details in the above embodiments. Within the scope of the technical spirit of the present invention, various simple modifications may be performed to the technical solution of the present invention. All of these simple modifications fall within the scope of the present invention.

Also it should be noted that various specific technical features described in the above specific embodiments, if not conflicting, may be combined in any suitable manner. In order to avoid unnecessary repetition, various possible combinations are not specified in the present invention.

In addition, various different embodiments of the present invention can also be arbitrarily combined, which should likewise be regarded as the disclosure of the present invention as long as they are not contrary to the idea of the invention.

The invention claimed is:

1. A lubricant composition, characterized in that the lubricant composition comprises a base oil and rubber particles having radiation crosslinked structure dispersed therein, wherein the base oil is the continuous phase and the rubber particles are the dispersed phase, wherein the rubber particles have an average particle size of 20-2000 nm.

2. The lubricant composition according to claim 1, wherein the amount of the rubber particles is 0.001 to 200 parts by weight in relation to 100 parts by weight of the base oil.

3. The lubricant composition according to claim 1, wherein the rubber particles have an average particle size of 70-500 nm.

4. The lubricant composition according to claim 1, wherein the rubber particles have a gel content of 60 wt % or more.

5. The lubricant composition according to claim 1, wherein the rubber particles are of a homogeneous structure.

6. The lubricant composition according to claim 1, wherein the rubber particles are at least one selected from the group consisting of natural rubber, styrene-butadiene rubber, carboxylated styrene-butadiene rubber, nitrile rubber, carboxylated nitrile rubber, polybutadiene rubber, silicone rubber, chloroprene rubber, acrylate rubber, styrene-butadiene pyridine rubber, isoprene rubber, butyl rubber, polysulfide rubber, acrylate-butadiene rubber, polyurethane rubber, fluoro rubber and ethylene-vinyl acetate rubber, and preferably at least one selected from the group consisting of styrene-butadiene rubber, carboxylated styrene-butadiene rubber, nitrile rubber, carboxylated nitrile rubber, acrylate rubber and ethylene-vinyl acetate rubber.

7. The lubricant composition according to claim 1, wherein the base oil is a mineral base oil and/or a synthetic base oil.

8. The lubricant composition according to claim 1, wherein the lubricant composition contains at most 60 parts by weight rubber particles having chemically crosslinked structure in relation to 100 parts of weight of the base oil.

9. A lubricant composition, characterized in that the lubricant composition comprises a base oil and rubber particles having radiation crosslinked structure dispersed therein, wherein the base oil is the continuous phase and the rubber particles are the dispersed phase, and wherein the rubber particles are modified physically or chemically.

10. A method for preparing a lubricant composition, which comprises mixing rubber particles having a radiation crosslinked structure with a base oil in which the rubber particles are dispersed, wherein the rubber particles have an average particle size of 20-2000 nm.

11. The method according to claim 10, further comprising at least one redispersion step.

12. A method for preparing a lubricant composition, comprising mixing rubber particles having a radiation crosslinked structure with a base oil in which the rubber particles are dispersed, which mixing comprises:
  (1) adding the rubber particles to be dispersed into the base oil and mixing by mechanical stirring, so that the rubber particles are dispersed or suspended in the base oil to obtain a preliminarily dispersed composition;
  (2) redispersing the preliminarily dispersed composition until the dispersed rubber particles have an average particle size of 20-2000 nm.

13. The method according to claim 12, which further comprises step (3), wherein the composition obtained in step (2) is subjected to the secondary redispersion, after placing at a temperature not lower than 80° C. for at least 1 hour.

14. The method according to claim 12, wherein the redispersing in step (2) and the secondary redispersing in step (3) are performed, independently of each other, in at least one mixing device selected from a homogenizer, a glass bead mill, a three-roll mill, a single-screw extruder, a multi-screw extruder, a kneader, a dissolver, and an ultrasonic disperser, and the placing operation in step (3) is performed in a sealed heating device.

15. The method according to claim 10, wherein the amount of the rubber particles to be dispersed is 0.001 to 200 parts by weight in relation to 100 parts by weight of the base oil.

16. The method according to claim 10, wherein the rubber particles to be dispersed are rubber particle clusters formed by agglomeration of rubber particles having an average particle size of 20-2000 nm.

17. The method according to claim 10, wherein the rubber particles to be dispersed have a gel content of 60 wt % or more.

18. The method according to claim 10, wherein the rubber particles to be dispersed are of a homogeneous structure.

19. The method according to claim 10, wherein the rubber particles to be dispersed are at least one selected from the group consisting of natural rubber, styrene-butadiene rubber, carboxylated styrene-butadiene rubber, nitrile rubber, carboxylated nitrile rubber, polybutadiene rubber, silicone rubber, chloroprene rubber, acrylate rubber, styrene-butadiene pyridine rubber, isoprene rubber, butyl rubber, polysulfide rubber, acrylate-butadiene rubber, polyurethane rubber, fluoro rubber and ethylene-vinyl acetate rubber, and preferably at least one selected from the group consisting of styrene-butadiene rubber, carboxylated styrene-butadiene rubber, nitrile rubber, carboxylated nitrile rubber, acrylate rubber and ethylene-vinyl acetate rubber.

20. The method according to claim 10, wherein the base oil is a mineral base oil and/or a synthetic base oil.

21. A lubricant composition prepared by the method according to claim 10.

22. A method of using a lubricant composition according to claim 1 comprising applying the lubricant composition to a machinery in the form of a lubricating oil or lubricating grease.

23. A method of preparing a lubricant composition, comprising providing rubber particles having the radiation crosslinked structure according to claim 1, and forming the lubricant composition.

24. The lubricant composition according to claim 1, wherein the amount of the rubber particles is 0.5 to 50 parts by weight in relation to 100 parts by weight of the base oil.

25. The lubricant composition according to claim 1, wherein the rubber particles have a gel content of 80 wt % or more.

26. The lubricant composition according to claim 1, wherein the base oil is a mineral base oil and/or a synthetic base oil;
the mineral base oil being at least one selected from the group consisting of low viscosity index mineral base oil having viscosity index VI≤40, medium viscosity index mineral base oil having 40<viscosity index VI≤90, high viscosity index mineral base oil having 90<viscosity index VI≤120, very high viscosity index mineral base oil having 120<viscosity index VI≤140 and ultrahigh viscosity index mineral base oil having viscosity index VI>140; and
the synthetic base oil being at least one selected from the group consisting of synthetic hydrocarbons, alkyl aromatic hydrocarbons, synthetic esters, polyethers, halogenated hydrocarbons, polysiloxanes, and fluorine-containing oils, wherein:
the synthetic hydrocarbon is at least one selected from the group consisting of ethylene oligomers, propylene oligomers, polybutene, polyisobutylene, poly(α-olefin), poly(internal olefin) and halogenated products of the above synthetic hydrocarbons,
the alkyl aromatic hydrocarbon is at least one selected from the group consisting of alkylbenzenes, alkylnaphthalenes and hetero atom-containing alkyl aromatic hydrocarbons,
the synthetic ester is at least one selected from the group consisting of monoesters, diesters, polyol esters, polymer esters, carbonates, phosphates, citrates, silicates and olefin-acrylate copolymers,
the polyether is at least one selected from the group consisting of aliphatic polyethers, polyphenylene oxides, polythioethers and perfluoroalkyl polyethers, and
the polysiloxane is at least one selected from the group consisting of dimeric siloxanes, trimeric siloxanes, tetrameric siloxanes, octameric siloxanes and cyclic tetrasiloxane.

27. The lubricant composition according to claim 1, wherein the lubricant composition contains at most 50 parts by weight of rubber particles having chemically crosslinked structure in relation to 100 parts of weight of the base oil.

28. The method according to claim 10, further comprising at least two redispersion step.

29. The method according to claim 10, which comprises:
(1) adding the rubber particles to be dispersed into the base oil and mixing by mechanical stirring, so that the rubber particles are dispersed or suspended in the base oil to obtain a preliminarily dispersed composition;
(2) redispersing the preliminarily dispersed composition until the dispersed rubber particles have an average particle size of 70-500 nm.

30. The method according to claim 12, which further comprises step (3), wherein the composition obtained in step (2) is subjected to the secondary redispersion, after placing at a temperature not lower than 100° C. for at least 1 hour.

31. The method according to claim 12, wherein the redispersing in step (2) and the secondary redispersing in step (3) are performed, independently of each other, in a homogenizer and the placing operation in step (3) is performed in a sealed heating device.

32. The method according to claim 10, wherein the amount of the rubber particles to be dispersed is 0.5 to 50 parts by weight in relation to 100 parts by weight of the base oil.

33. The method according to claim 10, wherein the rubber particles to be dispersed are rubber particle clusters formed by agglomeration of rubber particles having an average particle size of 70-500 nm.

34. The method according to claim 10, wherein the rubber particles to be dispersed have a gel content of 80 wt % or more.

35. The method according to claim 10, wherein the base oil is a mineral base oil and/or a synthetic base oil;
the mineral base oil being at least one selected from the group consisting of low viscosity index mineral base oil having viscosity index VI≤40, medium viscosity index mineral base oil having 40<viscosity index VI≤90, high viscosity index mineral base oil having 90<viscosity index VI≤120, very high viscosity index mineral base oil having 120<viscosity index VI≤140 and ultrahigh viscosity index mineral base oil having viscosity index VI>140; and
the synthetic base oil being at least one selected from the group consisting of synthetic hydrocarbons, alkyl aromatic hydrocarbons, synthetic esters, polyethers, halogenated hydrocarbons, polysiloxanes, and fluorine-containing oils, wherein the synthetic hydrocarbon is at least one selected from the group consisting of ethylene oligomers, propylene oligomers, polybutene, polyisobutylene, poly($\alpha$-olefin), poly(internal olefin) and halogenated products of the above synthetic hydrocarbons, the alkyl aromatic hydrocarbon is at least one selected from the group consisting of alkylbenzenes, alkylnaphthalenes and hetero atom-containing alkyl aromatic hydrocarbons, the synthetic ester is at least one selected from the group consisting of monoesters, diesters, polyol esters, polymer esters, carbonates, phosphates, citrates, silicates and olefin-acrylate copolymers, the polyether is at least one selected from the group consisting of aliphatic polyethers, polyphenylene oxides, polythioethers and perfluoroalkyl polyethers, and the polysiloxane is at least one selected from the group consisting of dimeric siloxanes, trimeric siloxanes, tetrameric siloxanes, octameric siloxanes and cyclic tetrasiloxane.

* * * * *